United States Patent [19]
Shaw

[11] Patent Number: 5,921,781
[45] Date of Patent: Jul. 13, 1999

[54] 3-DIMENSIONAL MODELS SHOWING CHEMICAL POINT GROUP SYMMETRY

[76] Inventor: C. Frank Shaw, 3273 N. Bartlett Ave., Milwaukee, Wis. 53211

[21] Appl. No.: 08/982,748

[22] Filed: Dec. 2, 1997

Related U.S. Application Data

[60] Provisional application No. 60/032,285, Dec. 3, 1996.
[51] Int. Cl.$^6$ .............................. G09B 1/00; A63H 33/12
[52] U.S. Cl. ......................... 434/298; 434/300; 434/211; 434/188; 446/122
[58] Field of Search .................................. 434/298, 299, 434/300, 188, 211; 446/118, 137, 92, 117, 122, 123

[56] References Cited

U.S. PATENT DOCUMENTS

| | | | |
|---|---|---|---|
| D. 156,773 | 1/1950 | Schaper | D34/15 |
| 1,329,850 | 2/1920 | Pye | 434/96 |
| 1,472,536 | 10/1923 | Thomson | 434/403 |
| 2,399,566 | 4/1946 | Owen | 434/258 |
| 2,709,318 | 5/1955 | Benjamin | 434/102 |
| 3,271,881 | 9/1966 | Wagnon | 434/300 |
| 4,014,110 | 3/1977 | Mayer | 434/277 |
| 4,040,630 | 8/1977 | Brattain | 273/157 R |
| 4,183,153 | 1/1980 | Dickson | 434/211 |
| 5,076,793 | 12/1991 | Aghevli et al. | 434/196 |
| 5,660,387 | 8/1997 | Stokes | 273/157 R |
| 5,785,529 | 7/1998 | Hearn et al. | 434/211 |

FOREIGN PATENT DOCUMENTS

| | | | |
|---|---|---|---|
| 2147633 | 5/1985 | United Kingdom | 446/118 |

OTHER PUBLICATIONS

Molecular Structures with Four–Fold Symmetry Axes—2 pages.
Wilson, Decius & Cross, Molecular Vibrations, Chapter 5, Symmetry Considerations, McGraw Hill, 1995.
Symmetry and Group Theory in Inorganic Chemistry, A Learning Module, C. Frank Shaw III, 1995, page 56.

*Primary Examiner*—Kien T. Nguyen
*Assistant Examiner*—Michael B. Priddy
*Attorney, Agent, or Firm*—Andrus, Sceales, Starke & Sawall

[57] ABSTRACT

A three-dimensional instructional model used to exhibit and represent specific point groups used in the application of group theory to symmetry operations and molecular structure. A pair of blocks, each have a pair of spaced faces with peripheral side surfaces extending between the faces, the number of side surfaces being equal to the principal rotational axis order of the point group to be represented. The blocks are connectable to one another with a face of each of the blocks opposing. The connection between the blocks can be made using a circular shaft inserted through openings in the blocks, by pins inserted in holes in abutting opposing faces of the blocks, or by adhering the face of one block directly to the face of the other to hold them rigidly in engagement with each other. The interconnection can also be made using a rotational locking mechanism allowing the blocks to rotate with respect to one another. A number of pegs are located in peg openings disposed in the side surfaces of each block, the pegs representing asymmetric units contained in each point group that are repeatable as the point group has the symmetry operations associated with the particular point group performed on it. The pegs can be either removably or permanently contained within the peg openings depending upon the flexibility desired for the model.

29 Claims, 7 Drawing Sheets

3-DIMENSIONAL MODELS SHOWING CHEMICAL POINT GROUP SYMMETRY

CROSS REFERENCE TO RELATED APPLICATION

This application claims the priority of U.S. provisional application Ser. No. 60/032,285, filed Dec. 3, 1996.

FIELD OF THE INVENTION

The present invention relates generally to instructional aids used in teaching concepts relating to organic and inorganic chemistry. More specifically, the invention relates to three dimensional models used to illustrate specific concepts and specific axial point groups when explaining the application of group theory to symmetry operations and molecular structure.

BACKGROUND OF THE INVENTION

Group theory is a mathematical formalism which has important applications in chemistry, physics and geology. In particular, the symmetry operations, namely rotations, reflections, inversions, reflection-rotations, and identity, inherent in molecular structures, constitute mathematical groups. These mathematical groups are known as point groups because one or more points at the center of the structure are unshifted by all of the operations of the group. Each point group has an overall order, equal to the number of times the basic asymmetric unit, or any random point, of a symmetrical structure will be repeated. This overall order also equals the number of symmetry operations associated with a given point group. Group theory and classification schemes for assigning molecules to their point groups are taught in advanced undergraduate and/or beginning graduate courses in the chemistry and physics curricula of modern universities.

Many important properties of various organic and inorganic molecules can be ascertained through assigning point groups comprised of three dimensional symmetry operations to those molecules. For example, depending on the point group assigned to a given molecule based on the number of symmetry operations found for that molecule, one can determine the presence or absence of a dipole moment in the molecule. Whether the molecule is optically active can be determined using point group symmetry. Point group symmetry may also be used to evaluate whether certain molecules require resonance structures for an accurate valence bond representation of bonding and also whether the atomic orbitals in particular orientations of certain molecules will have a finite or zero net overlap. In short, point group symmetry has numerous beneficial applications in evaluate and classifying various organic and inorganic molecules, while requiring only analysis of certain symmetrical attributes of the structure of the molecule.

The teaching of the principles of point group symmetry is difficult because specific molecules belonging to various point groups have very disparate structures and their three dimensional structures are often difficult to represent in two dimensions. Thus, accurate representations in textbooks of various structures and molecules exhibiting certain point groups are not readily achievable.

Various molecular model sets constructed from numerous materials are well-known and commonly used teaching tools for illustrating molecular structures, mainly the relative positions of the constituent atoms in the molecule. Their utility is not readily extended to the systematic illustration of the symmetry point groups, because in most molecules, some atoms sit on the symmetry axes, planes or centers, and therefore are fewer in number than the full order of the group. For example, the molecule $AuCl_4^-$ is in the point group $D_4h$, that has an overall order of 16, but the molecule itself has only four chlorides lying off the principal four-fold axis of the point group.

BRIEF SUMMARY OF THE INVENTION

It is an object of the present invention to provide three dimensional models that accurately and vividly exhibit all symmetries associated with various point groups present in certain molecules and present asymmetric units equal in number to the overall group order. The models have sufficient visual impact to immediately reveal the symmetry operations present in the model and to allow students to explore the differences in the symmetry of the chemically important point groups.

It is a further object of the invention to provide three dimensional point group models comprised, and assembled from, basic, interchangeable parts that may be increased or decreased in size to create either large models suitable for classroom and lecture hall use, or smaller models to be assembled from inexpensive kits for use by students. For example, in analyzing the symmetry of a particular molecule, a model of the point group assigned to that molecule could be utilized in a classroom to clearly illustrate how the symmetry operations are performed on that molecule to assign the molecule that particular point group.

In particular, models for the axial point groups ($C_n$, $C_{nv}$, $C_{nh}$, $D_n$, $D_{nh}$, $D_{nd}$, and $S_{2n}$; where n is the order of the principal rotational axis and can be 2,3,4,5 or 6) can be provided by the present invention, thereby illustrating the most important orders of rotational axes for molecular symmetry; 2-fold, 3-fold, 4-fold, 5-fold and 6-fold. Interchangeable models for the point groups with a 4-fold axis can also be used for point groups with 2-fold axes. Models for point groups with 6-fold axes can be used to illustrate point groups with 3-fold and 2-fold axes.

In accordance with the invention, a pair of geometric prisms or blocks, formed as thick plates of a rigid and durable material, are used to construct models representative of specific point groups. The plates represent the order of the principal rotational axis of the point group, the principal axis passing perpendicularly through the center of the plates. Each block has a pair of spaced faces with peripheral side surfaces extending between the faces. The faces on each block have a geometric shape with a number of sides, allowing the block to simulate a point group having a principal rotational axis order equal to the number of sides in the geometric shape of the face on the block. In other words, the number of times a block can be rotated around its center to a new position symmetrical from a previous position equals the principal rotational axis order of the block. This number is also equal to the number of side surfaces present on the block. For example, triangular, square, pentagonal and hexagonal blocks having 3, 4, 5 and 6 sides are used to form models representing the corresponding point groups with principal rotational axes of order 3, 4, 5 and 6, respectively.

In a complete model representing a single point group, two geometric blocks with the same number of sides are interconnected with faces of each of the blocks opposing each other. The opposing faces may abut or be spaced from each other. The side surfaces of each block are in either a peripherally aligned configuration or a peripherally offset configuration with respect to each other. The different configurations are necessary as certain of the point groups to be represented have aligned configurations while others have offset configurations. The blocks can be interconnected to create a rigid, permanent model either by directly connecting adjacent faces of the blocks to each other, or by inserting a shaft through a shaft opening located in the center of each block, and securing the blocks to the exterior of the shaft, leaving the blocks spaced a distance apart from one another along the shaft. The shaft may be circular to allow any desired peripheral configuration of the side surfaces to be established. The shaft also illustrates the direction and position of the principal rotational axis of the point group shown by the model. As stated before, the order of this principal axis is determined by the number of side surfaces present on the blocks.

In either construction, an appropriate number of pegs representing the asymmetrical units for the particular point group to be represented are inserted into peg mounting openings in the side surfaces of one or both of the blocks to form a model of the desired point group. In performing the symmetry operations associated with a particular point group on a model representing that point group, it is the number of times the configurations of the asymmetric units, represented by the pegs, can be repeated that illustrate the overall order of the model and point group. The overall order of a particular model or point group is greater than the principal rotational axis order of that group for most point groups, except for the Cn group, where the orders are equal due to the lack of any symmetry operations other than rotations about the principal rotational axis. The pegs may be secured in the peg mounting openings, as by an adhesive.

In another embodiment of the invention, the blocks are not permanently interconnected to one another. A number of connecting pins are inserted into opposed pin openings spaced around the central axis of the blocks on the opposing interior faces of the geometric blocks to rigidly, but removably, hold the pair of blocks in connection with each other. As the pins are removable from the pin openings, the pins may be reused to form models of other point groups utilizing different geometric blocks.

The pegs representing the asymmetrical units of the point groups formed using this embodiment may also be attached to the geometric blocks in a removable fashion to allow for various point groups with the same order to be illustrated using the same pair of geometric blocks.

In a further embodiment of the invention, the geometric blocks are constructed to contain a rotational locking mechanism to allow them to be rotatable with respect to one another when interconnected to form the point group model. A spring-biased detent is disposed within and extends outwardly from the interior face of one geometric block and a series of depressions are disposed in an equally spaced, circular pattern on the opposing interior face of the second, opposed geometric block. The circular pattern of the depressions has a radius equal to the distance of the spring biased detent from the center of its respective geometric block, to allow the detent to selectively engage each of the depressions. The depressions are disposed on the interior face of the second, opposed geometric block in such a way so as to allow the blocks to be rotated and held in positions wherein the side surfaces of the blocks are peripherally aligned or also peripherally offset. Typically, the amount of peripheral offset is equal to one-half "turn", i.e. ½( 360/ n ) where n is the number of side surfaces present on the geometric blocks. The blocks are connected to each other with these interior faces opposing each other using a threaded bolt inserted through a shaft opening located in the center of each geometric block and in the center of the circular pattern. As the blocks are rotated with respect to each other, the detent is displaced inwardly by the interior face of the opposing block, allowing the blocks to rotate, until the detent reaches a depression. The detent extends into the depression, locking the blocks in that position until a sufficient force is applied to inwardly displace the detent again. The necessary rotational forces can easily be generated manually.

To facilitate rotation of the blocks with respect to one another, before connection of the blocks using the bolt, a thin, low friction separating disk, having a bolt opening located at its center, may be disposed between the two blocks with the bolt opening aligned with the shaft openings of the geometric blocks. The bolt is secured on the exterior faces of both blocks by a washer and nut threadably mounted on the bolt and tightened down onto the exterior faces of the geometric blocks. A pair of rigid handles having threaded bolt cavities are threadably mounted onto the ends of the bolts that protrude beyond the nuts from the exterior faces of the geometric blocks. These rigid handles may also be partially contained within handle cavities disposed in the center of the exterior faces of the geometric blocks, the handle cavities surrounding the shaft opening and extending part way through the blocks.

In a further embodiment of the present invention, the blocks are replaced with a cube to represent both the octahedral ($O, O_h$) and tetrahedral ($T, T_h, T_d$) point groups, or the cubic point groups, collectively. These point groups have multiple intersecting high order rotational axes, namely, fourth-order axes passing through the centers of opposite faces of the cube and/or third-order axes passing through opposite corners of the cube, and, therefore, high overall orders. To illustrate these point groups, a pair of peg mounting openings are located in each corner of each face of the cube. The openings are spaced equidistant from the diagonal line intersecting the respective corner in which the openings are located and also a short distance inward from the edges of the faces forming the corner. Each opening extends a short distance into the cube so as not to intersect any peg mounting opening on an adjacent cube face. The attachment of the pegs within the peg mounting openings is achieved in a similar manner as with the previous embodiments and a number of pegs utilized also depends, as before, upon the particular point group to be represented by the model.

In addition to the variations in the construction of the blocks described above, the construction of the pegs may also be varied. For example, the pegs may be formed of a metal mounting portion, that is inserted into peg mounting openings located in the side surfaces of the geometric blocks, and a wooden knob attached to the free end of the metal mounting portion. The pegs, while being removable from the peg mounting openings, are held within the openings by magnets disposed in magnet slots extending into the block from the interior opposed faces of the blocks. The magnets intersect the interior ends of the peg mounting openings. The magnetic attraction between the magnet and the metal mounting portion of the peg is sufficient to securely hold the peg within the opening, but is weak enough to allow the peg to be manually removed.

BRIEF DESCRIPTION OF THE SEVERAL
VIEWS OF THE DRAWING

The drawings furnished herewith illustrate preferred constructions of the present invention in which the above advantages and features, as well as others, are clearly disclosed as will be readily understood from the following description of the illustrated embodiment.

FIG. 12a, b, and c are top elevational views showing variations in the configurations of the blocks.

DETAILED DESCRIPTION OF THE PREFERRED EMBODIMENT

Figures 1, 2, 3:
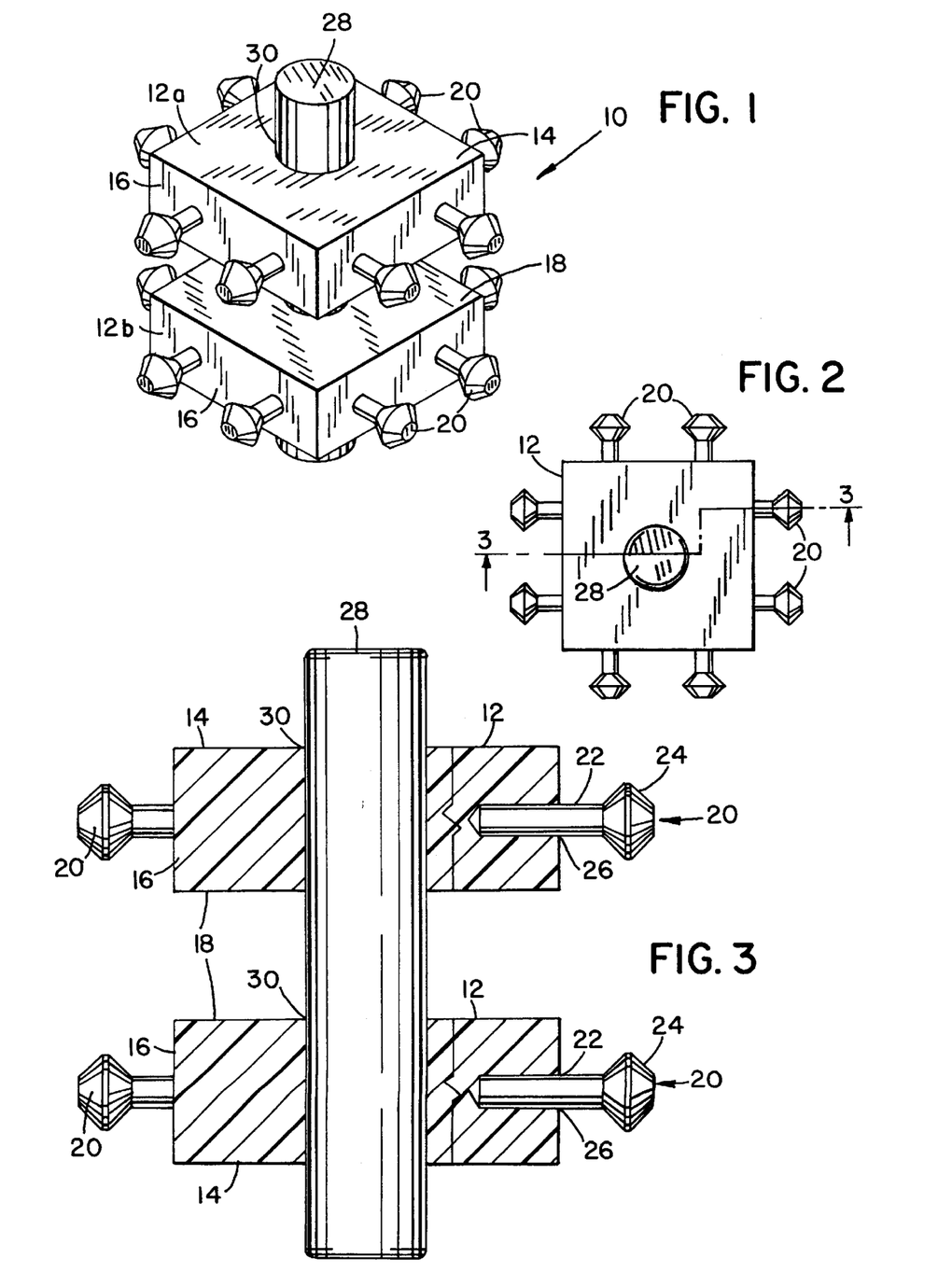
FIG. 1 is a perspective view of a point group symmetry model constructed according to the present invention.
FIG. 2 is a top view of the model as shown in FIG. 1.
FIG. 3 is a cross-sectional view taken along line 3—3 of FIG. 2.

FIGS. 1–3 illustrates a 3-dimensional point group symmetry model 10 constructed according to the present invention. Model 10 is formed of a pair of plate-like geometric prisms or blocks 12a, 12b, a shaft 28 and a number of pegs 20. Blocks 12a, 12b, shaft 28, and pegs 20 may be formed of wood, plastic, metal or other suitable material. Blocks 12a, 12b each have an exterior, unopposed face 14 and an interior, opposed face 18. Exterior face 14 and interior face 18 of each block are joined by side surfaces 16. Depending on the point group to be represented by the model 10, blocks 12a, 12b will have an appropriate geometric shape and a number of side surfaces 16 commensurate with that geometric shape. Specifically, blocks 12a, 12b have a geometric shape with a number of sides to simulate a point group with an axis order equal to the number of sides of the geometric shape. FIG. 1 shows four sided blocks 12a, 12b to represent point groups with an axis order 4.

Each side surface 16 has a pair of peg mounting openings 26. With model 10 oriented as shown in FIG. 1, peg mounting openings 26 are positioned equidistant from the vertical center line of each side 16 and along the horizontal center line of each side 16. A complete set of openings 26 will number 4 times the axis order. With the four sided blocks 12a, 12b shown in FIGS. 1 et seq the number of openings will be sixteen, i.e. 4 times the axis order 4. This represents all possible symmetry generated positions needed to be present in order to generate, in turn, all possible point groups of that order.

Referring now to FIG. 3, pegs 20 are comprised of a peg mounting portion 22 and a peg knob 24 attached to the free end of peg mounting portion 22. Peg mounting portions 22 of pegs 20 are inserted and retained in peg mounting openings 26 located in side surfaces 16 of blocks 12a, 12b. While each side surface 16 has a pair of peg mounting openings 26, the number of pegs 20 contained in the peg mounting openings 26 on side surfaces 16 of blocks 12a, 12b depends upon the particular point symmetry group to be represented by the model 10 formed of blocks 12a, 12b. Inserting the requisite number of pegs 20 into the proper openings 26 will create models for all 7 or 6 point groups for a particular order of rotation. All the mounting peg openings 26 need not contain a peg 20 and for permanent models only openings 26 that must accept a peg need be formed in blocks 12a, 12b.

The blocks 12a, 12b of model 10 are connected to one another by shaft 28 which is coaxial with central axes of blocks 12a, 12b and therefore symbolically represents the axis of the molecule. Shaft 28 is inserted through shaft openings 30 located in the center of each block 12a, 12b and extending therethrough.

Figure 8:
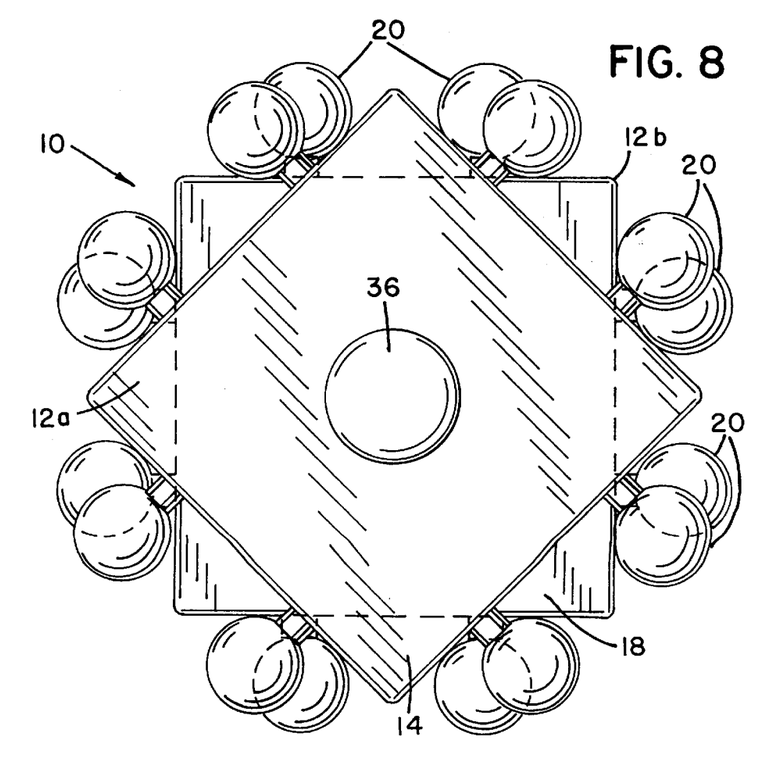
FIG. 8 is a top elevational view of the model of FIG. 7 showing the top portion of the model rotated 45° with respect to the bottom portion.

FIGS. 1 and 3 show the blocks 12a, 12b of model 10 with the side surfaces 16 of each block in a peripherally aligned position. On attachment of blocks 12a, 12b to shaft 28 through shaft openings 30, one of the blocks 12a or 12b may be rotated about shaft 28 to a position in which the side surfaces are peripherally offset and in which corresponding side surfaces 16 on blocks 12a, 12b are not in alignment with each other to represent point groups that contain offset configurations. FIG. 8 illustrates this orientation. The amount of peripheral offset is usually equal to one-half "turn" i.e. ½(360/n) where n is the number of side surfaces of the geometric shape of a block 12a, 12b. However, certain point groups may have the blocks 12a, 12b at any arbitrary angle of rotation from 0° to 90°. Shaft 28 and openings 30 are peripherally circular to facilitate such rotation.

In forming model 10 by connecting blocks 12a, 12b to shaft 28 and connecting pegs 20 to blocks 12a, 12b using peg mounting openings 26, an adhesive may be applied to shaft 28 and peg mounting portions 22 of pegs 20 to secure blocks 12a , 12b around shaft 28 and pegs 20 within peg mounting openings 26 to form a permanent model 10 of a particular point group.

In summary, FIG. 1 shows a model 10 which can be fitted with sixteen pegs 20 to represent the point group $D_4h$. Center shaft 28 holds the upper and lower blocks 12a, 12b together and is deemed collinear with the 4-fold axis.

By appropriate placement of an appropriate number of pegs 20, fixed models 10 for the point groups with rotational axes of order 4 ($C_4$; $C_{4v}$; $C_{4h}$; $S_8$; $D_4$; $D_4h$; $D_4d$) and $S_4$ can be created. The groups $S_8$ and $D_4d$ require the blocks 12a, 12b to be offset by 45°; the model for $D_4$ may have the blocks at any arbitrary angle from 0 to 90°. This structure can also be used to generate point groups with a $C_2$ axis ($C_2$; $C_{2v}$; $C_{2h}$; $S_4$; $D_2$; $D_{2h}$; $D_{2d}$) and the trivial point groups $C_1$; $C_s$; and $C_i$.

Figure 4:
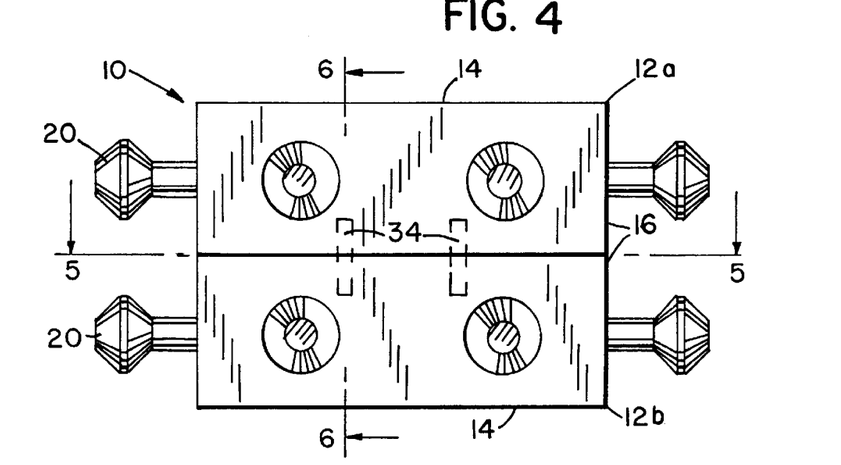
FIG. 4 is a side elevational view of a further embodiment of a point group symmetry model constructed according to the present invention.
Figures 5, 6:
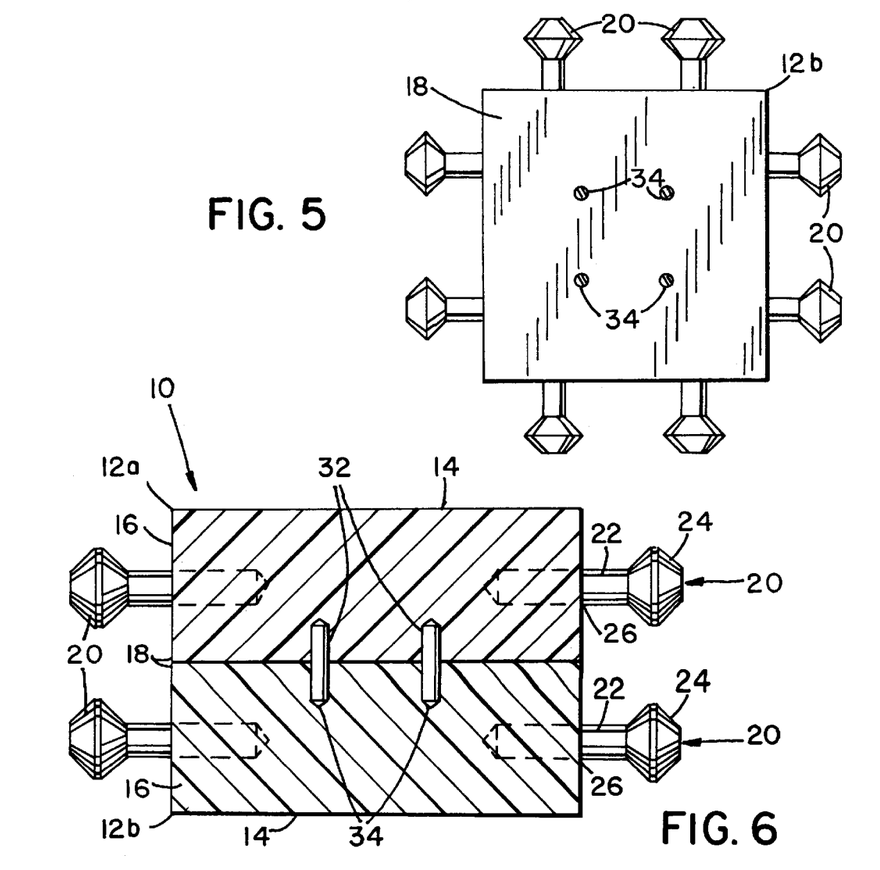
FIG. 5 is a cross-sectional horizontal view taken along line 5—5 of FIG. 4.
FIG. 6 is a cross-sectional vertical view taken along line 6—6 of FIG. 4.

An alternative embodiment of the present invention is shown in FIGS. 4–6. In this embodiment, shaft 28 and shaft openings 30 in blocks 12a, 12b are replaced with pins 32 and pin openings 34. Pin openings 34 are located on the interior, opposed faces 18 of blocks 12a, 12b in a square configuration about a central, vertical axis of the model 10, as shown in FIG. 5. Pin openings 34 are situated on the interior faces 18 of each block 12a, 12b so as to be aligned with one another when blocks 12a, 12b are connected to form model 10, as seen in FIG. 4. Additional pin openings 34 may be provided in the opposing faces of blocks 12a, 12b so as to allow the blocks to be connected with peripherally offset side surfaces 16.

FIG. 6 shows pins 32 disposed within pin openings 34 and connecting blocks 12a, 12b to form model 10. Pins 32 may be secured within pin openings 34 using an adhesive in a manner similar to that used in the previous embodiment for pegs 20 and shaft 28. Or, pins 32 may be removable from pin openings 34, allowing pins 32 to be reused to form models 10 employing geometric blocks in a different orientation or of a different shape to form different point groups.

Figure 7:
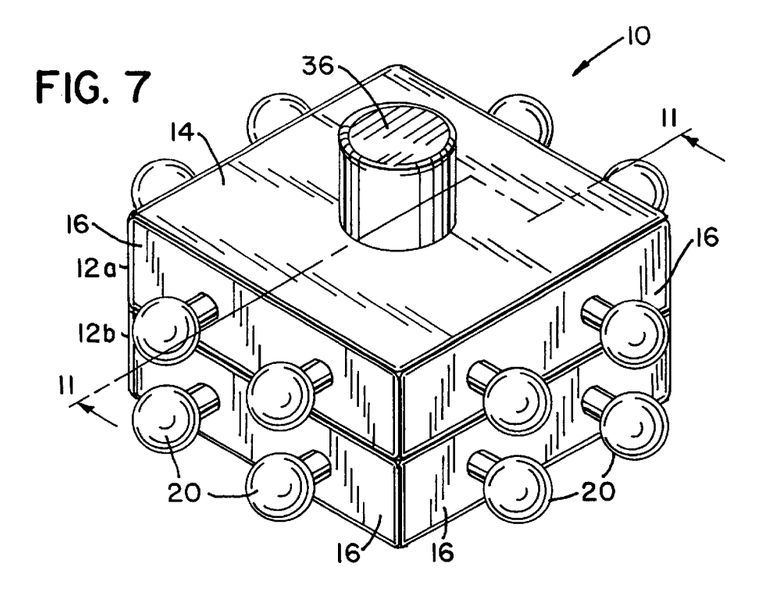
FIG. 7 is a perspective view of a point group symmetry model constructed according to the present invention utilizing a rotational locking mechanism.

FIGS. 7–11 show a third embodiment of the present invention including a rotational locking mechanism. In this embodiment, model 10 is constructed of a pair of plate-like geometric blocks 12a, 12b, formed of a material, such as hard plastic, each having an exterior, unopposed face 14, an interior, opposed face 18, and a number of side surfaces 16 with peg mounting openings 26 containing a number of pegs 20, similar to the previously described embodiments. However, as shown in FIGS. 7 and 8, the rotational locking mechanism utilized in this embodiment allows blocks 12 comprising model 10 to be rotated with respect to one another from a peripherally aligned position, as shown in FIG. 7, to a peripherally offset position, as shown in FIG. 8.

Figure 9:
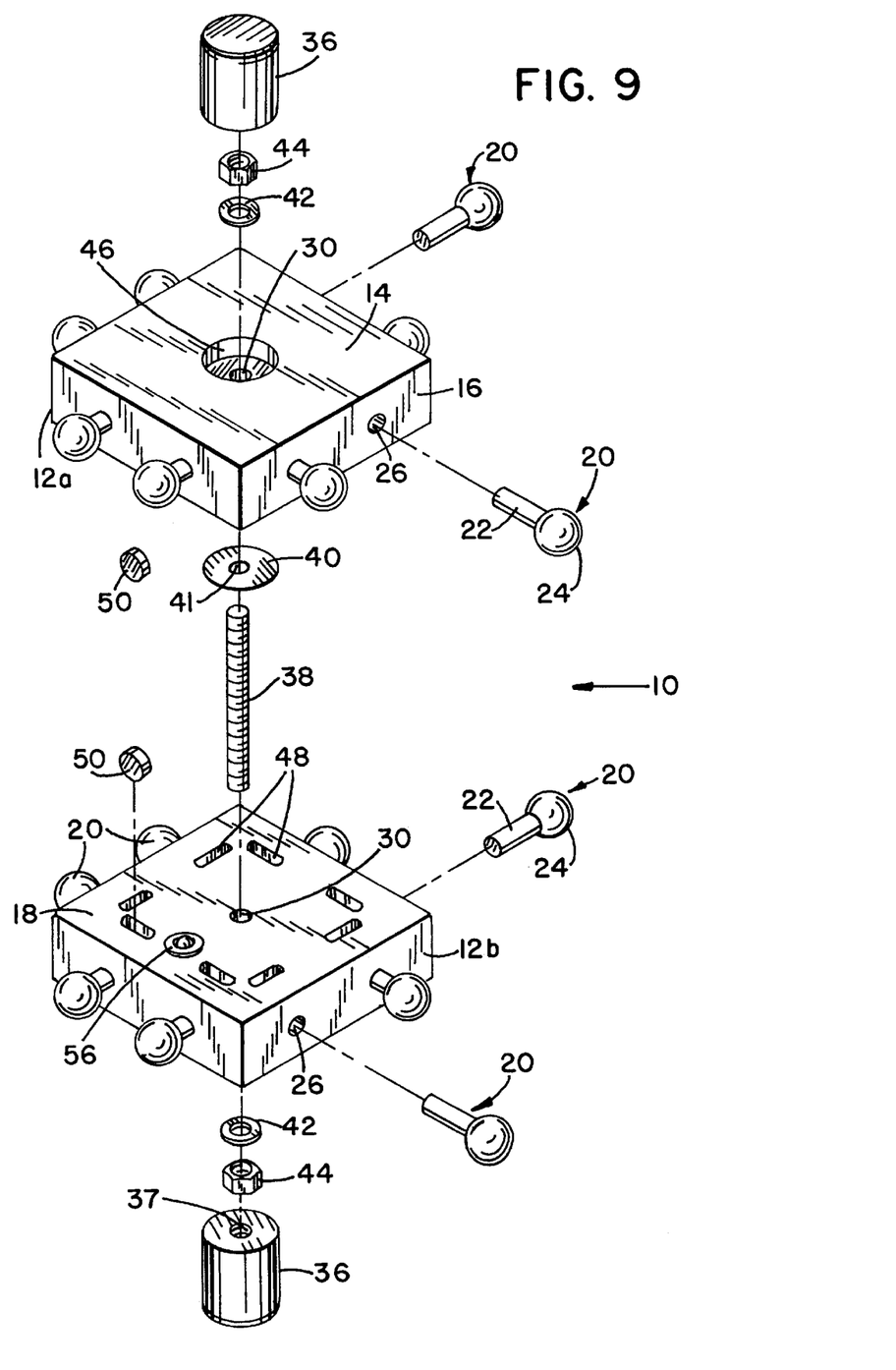
FIG. 9 is an exploded perspective view of the model shown in FIG. 7.
Figure 10:
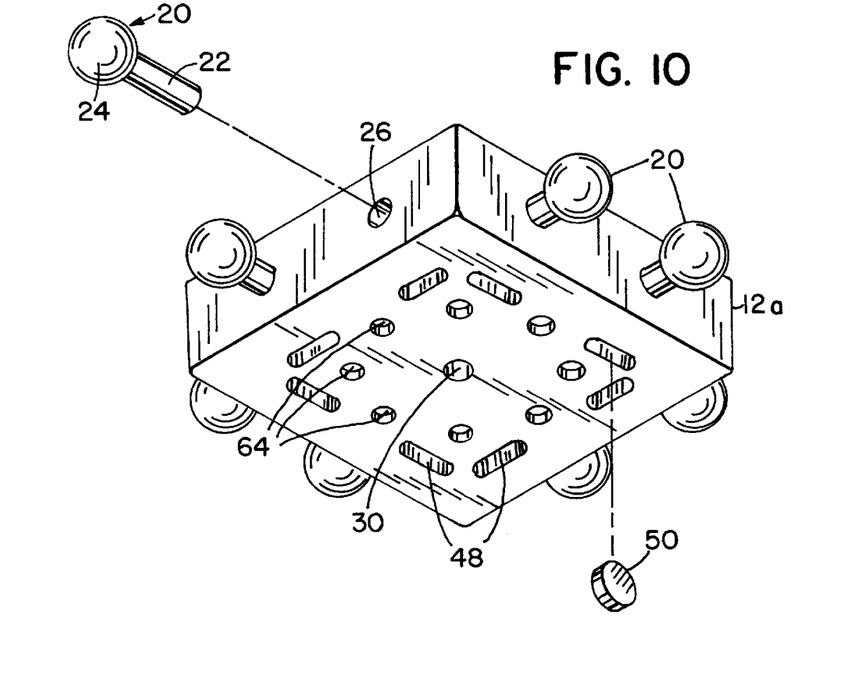
FIG. 10 is a bottom perspective view of the top half of the model shown in FIG. 7.
Figure 11:
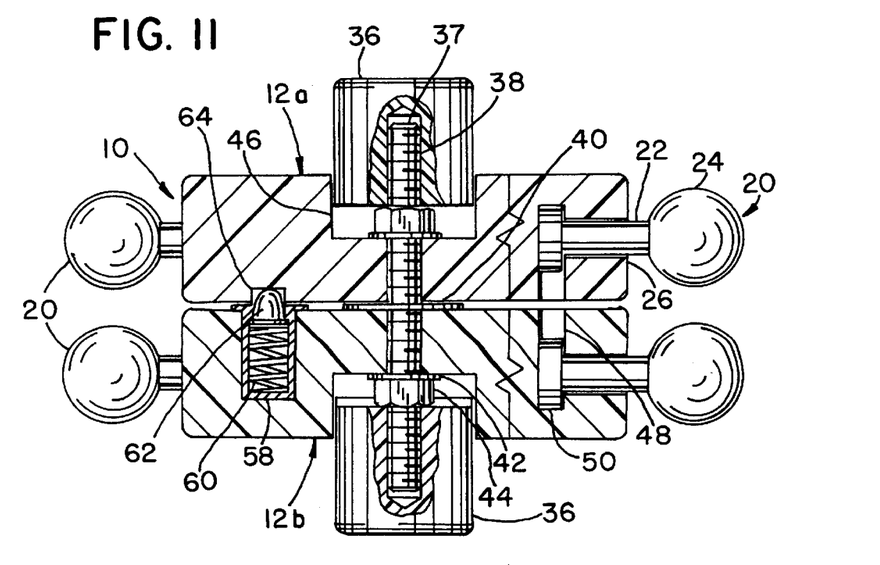
FIG. 11 is a cross-sectional view taken along line 11—11 of FIG. 7.

Referring now to FIGS. 9–11, model 10 is constructed of a first plate-like geometric block 12a located above a similar plate-like second geometric block 12b. As shown in FIGS. 9 and 11, blocks 12a and 12b are connected by a threaded bolt 38 inserted through shaft openings 30 in the center of blocks 12a and 12b. Threaded bolt 38 is secured to the exterior faces 14 of blocks 12a and 12b by washers 42 and nut 44 threadably attached to each end of bolt 38. Washers 42 and nuts 44, when fastened to secure blocks 12a and 12b to threaded bolt 38, are contained within handle cavities 46 that extend into the exterior faces 14 of blocks 12a and 12b and surround shaft openings 30 in blocks 12a and 12b. Threadably mounted onto threaded bolt 38 above nuts 44 and partially contained within handle cavities 46, are handles 36 that contain threaded bolt cavities 37.

Referring now to FIG. 10, on the interior opposed faces 18 of blocks 12a and 12b are located magnet slots 48, with one magnet slot 48 being present for each peg mounting opening 26 of blocks 12a and 12b. Magnet slots 48 extend from interior faces 18 partially through blocks 12a and 12b and intersect the interior ends of adjacent peg mounting openings 26. A small magnet 50 is disposed within each magnet slot 48. Magnets 50 disposed in magnet slots 48 are used to retain pegs 20 within peg mounting openings 26 as in this embodiment, peg mounting portion 22 of peg 20 is formed from a metal and is attracted to magnet 50 when inserted into peg mounting opening 26. Peg knob 24 of peg 20 in this embodiment may be formed of a wooden sphere attached to the free end of peg mounting portion 22.

The structure of the rotational locking mechanism included in this embodiment is also shown in FIGS. 9–11. On the interior opposed face 18 of block 12b is located a spring-biased detent 56. The detent comprises a metal housing 58 that encloses and contains detent spring 60 and detent head 62, which extends partially out from the end of housing 58. The detent 56 is contained within detent opening 59 located on the interior face 18 of block 12b. On the interior opposed face 18 of block 12a is a series of equally spaced detent depressions 64 arranged in a circular pattern about shaft opening 30, as shown in FIG. 10. Detent depressions 64 enclose a portion of detent head 62 when detent 56 is aligned with a detent depression 64 as seen in FIG. 11. A low friction disk 40 having a bolt hole 41 located in its center, allowing for insertion of threaded bolt 38 therethrough, is placed between blocks 12a and 12b, as seen in FIG. 9. Low friction disk 40 disposed between block 12a and block 12b has a diameter less than that of the circular pattern of detent depressions 64 on block 12b to avoid any interference with the engagement of detent 56 with detent depressions 64. Disk 40 is formed of plastic or other suitable material to facilitate rotation of blocks 12a and 12b with respect to each other by providing low friction surfaces for blocks 12a and 12b to rotate on.

In utilizing the rotational locking mechanism, a manual rotational force is applied to either block 12a or block 12b while holding the remaining block stationary. Detent head 62, resting in detent depression 64 is pressed up against the edge of detent depression 64, compressing detent head 62 down against spring 60, thus pushing detent head 62 within housing 58. With detent head 62 compressed within housing 58 by interior opposed face 18 of block 12b, second block 12b may be rotated with respect to block 12a until another detent depression 64 in the circular pattern rotates over detent head 62 allowing detent head 62 to be extended into detent depression 64 by spring 60. When detent head 62 is partially contained within detent depression 64, block 12b is locked in position with respect to block 12a.

Figures 12A, 12B, 12C:
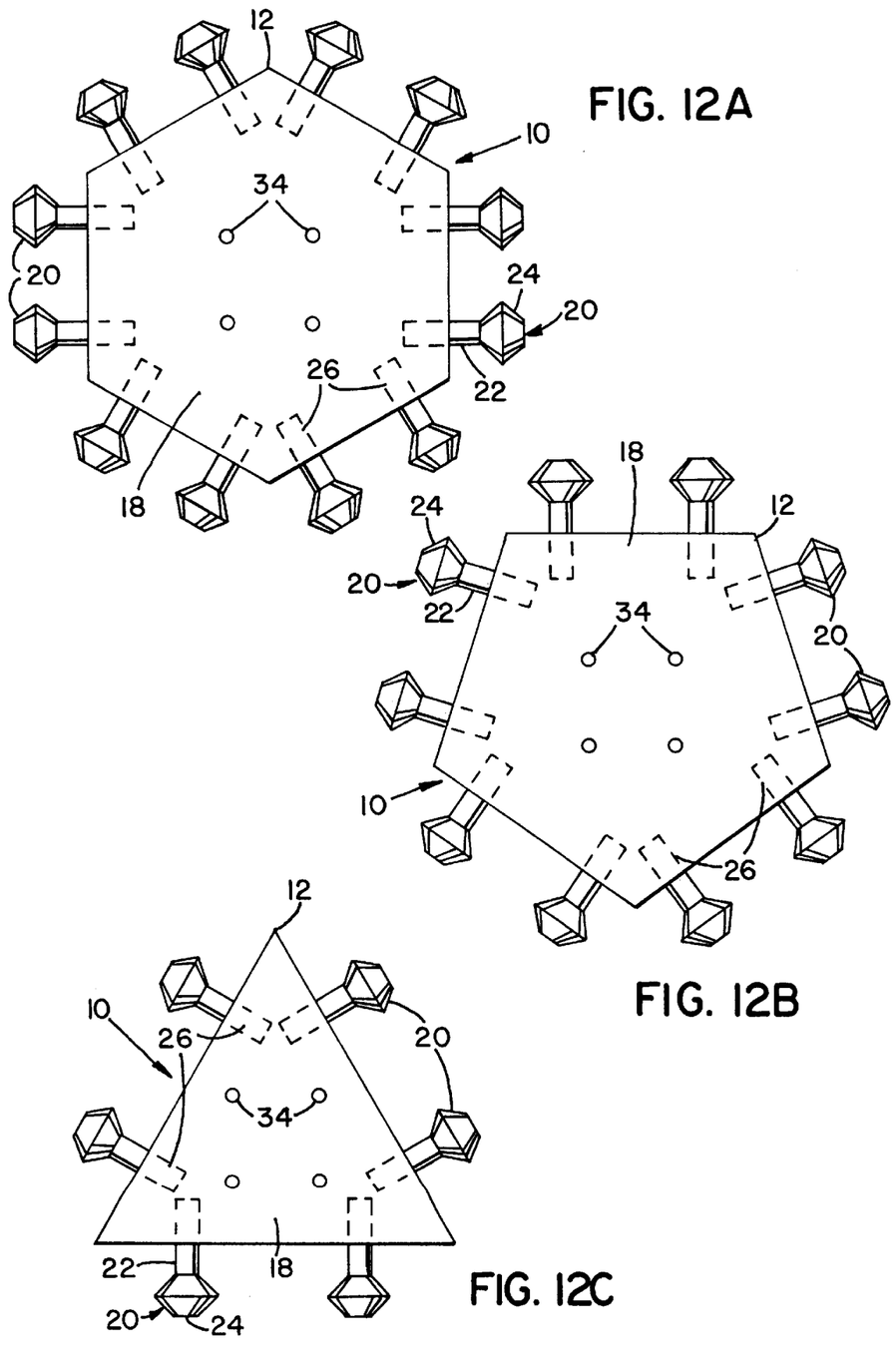

While four sided blocks are shown in FIGS. 1 through 11 in connection with the representation of point groups with a axis of order 4, as noted above blocks with a lesser or greater number of sides may be used, as shown in FIGS. 12a, 12b, and 12c, in accordance with the order of the point group to be represented. While blocks having a greater number of sides than six may be used, as a practical matter few molecules have rotational orders in excess of six-fold.

Figure 13A:
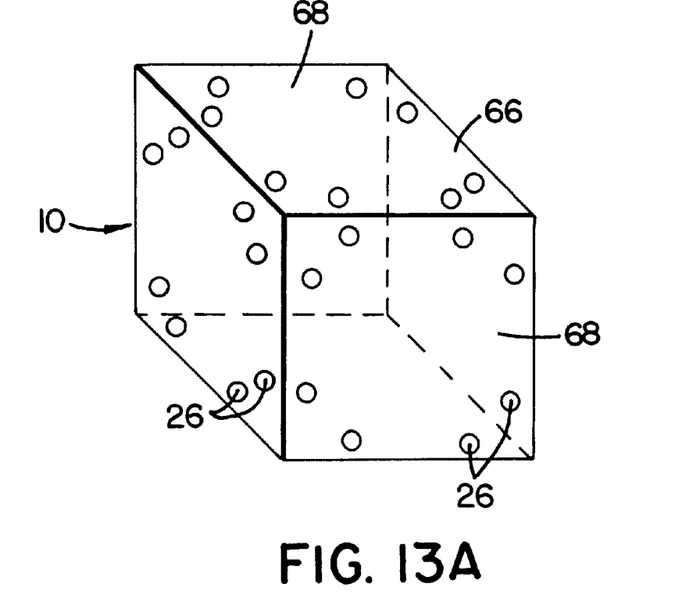
FIGS. 13a and 13b are perspective views of an embodiment of the invention for showing high order or cubic point groups.
Figure 13B:
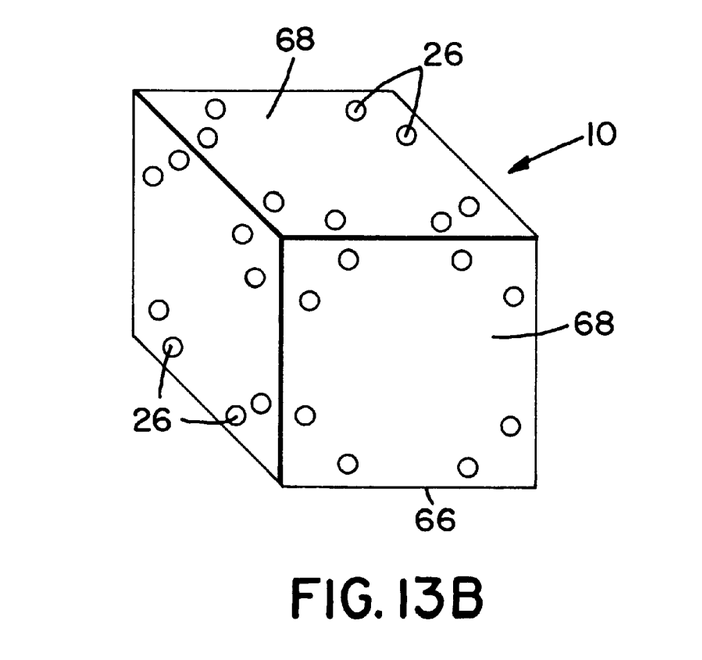

A fourth embodiment of the present invention is shown in FIGS. 13a and 13b. In this embodiment, the model 10 is formed from a rigid cube 66 that has pairs of peg mounting openings 26 located in each corner of each face 68 of rigid cube 66. Peg mounting openings 26 extend a short distance into rigid cube 66 and retain pegs (not shown) similar to those illustrated in previous embodiments. In forming these models 10 by inserting pegs (not shown) into peg openings 26, an adhesive may be applied to the pegs (not shown) to secure them within the peg mounting openings 26.

By appropriate placement of an appropriate number of pegs (not shown), models 10 representing the cubic point groups, namely the octahedral point groups (O,$O_h$) and the tetrahedral point groups (T,$T_h$, $T_d$) can be created.

Various modes of carrying out the invention are contemplated as being within the scope of the following claims particularly pointing out and distinctly claiming the subject matter which is regarded as the invention.

I claim:

1. A model for demonstrating the application of group theory to symmetry operations comprising:

a pair of blocks, each of said blocks having a pair of spaced faces and a plurality of peripheral side surfaces extending between the faces, said blocks being oriented with respect to each other so that a face of one block opposes a face of another block and so that a central axis of each block is aligned, the blocks having a defined, common, geometric shape with the number of side surfaces corresponding to an order of a principal rotational axis and, said blocks having a plurality of peg mounting openings located in each of the side surfaces of the blocks, the number of said openings corresponding at least to the number of asymmetric units of the particular point group to be demonstrated, said openings being displaced from a rotational symmetry axis or a plane of symmetry of the model; and a plurality of pegs mounted to the blocks in the peg mounting openings to represent the appropriate number of asymmetric units of the particular point group to be demonstrated.

2. The model of claim 1 wherein the geometric shape of said blocks, when viewed in a plane parallel to said faces, is a selected one of triangular, square, pentagonal, and hexagonal.

3. The model of claim 1 wherein said blocks are oriented with the side surfaces of the blocks in a selected one of a peripherally aligned configuration and a peripherally offset configuration.

4. The model of claim 3 wherein when said side surfaces of said blocks are in the peripherally offset configuration, one of the blocks is rotated about said central axis with respect to the other of said blocks by an angular amount equal to ½(360/n) where n is the number of side surfaces of said blocks.

5. The model of claim 1 wherein the blocks are connected to each other by a shaft extending completely through a shaft opening located in each block.

6. The model of claim 5 wherein the blocks are spaced from each other along the shaft.

7. The model of claim 6 wherein the blocks are affixed to the shaft.

8. The model of claim 1 wherein opposing faces of said blocks are abutting and the blocks are connected to each other by a set of pins, each pin having its ends disposed in pin openings located in the abutting interior faces of each of the pair of blocks and spaced around the central axis of the blocks.

9. The model of claim 5 wherein the shaft is a threaded bolt inserted through shaft openings in the blocks and at least one threaded nut is mounted to the bolt for securing said blocks together.

10. The model of claim 1 wherein the location of said peg mounting openings in the side surfaces of each of said blocks is the same.

11. The model of claim 1 wherein the number of said peg mounting openings in the side surfaces of each of said blocks is the same.

12. The model of claim 1 wherein the number of said peg mounting openings in the side surfaces of each of said blocks is different.

13. The model according to claim 1 wherein the number of peg mounting openings in said side surfaces of said blocks is four times the order of the principle rotational axis.

14. The model of claim 1 wherein the pegs have a mounting portion, mountable within the peg mounting opening of the block, and a knob disposed at one end of the mounting portion.

15. The model of claim 14 wherein the pegs are affixed within the peg mounting openings.

16. The model of claim 14 wherein the mounting portion of the pegs are cylindrical mounting portions and the peg mounting openings are cylindrical peg mounting openings.

17. The model of claim 14 wherein the mounting portion of the pegs is made of a metal and the knob of the peg is a non-metallic knob attached to the free end of the mounting portion.

18. The model of claim 17 wherein the blocks include magnet slots extending partially through the blocks to intersect with the interior end of said peg mounting opening, and magnets disposed in each magnet slot that contact and retain, by magnetic attraction, the metal mounting portion of each peg.

19. The model of claim 1 wherein opposing faces of said blocks are held in abutment by a central fastener and wherein said model includes a rotational locking mechanism.

20. The model of claim 19 wherein said rotational locking mechanism comprises: a spring-biased detent contained within and protruding from the interior opposed face of a first block and a set of detent depressions in the interior opposed face of a second block, said depressions being spaced in a circular pattern around the central axis of said second block, said detent being extendable from its compressed position, achieved when the detent is disposed against the interior face of the second block between two of the depressions, into a depression to lock the blocks in position with respect to each other.

21. The model according to claim 20 further including a thin, low friction disk placed between said blocks and having a hole for receiving said fastener.

22. The model of claim 19 further comprising handles mounted on exposed ends of said fastener for manually rotating said blocks.

23. The model of claim 22 wherein said fastener is a bolt and wherein said handles have threaded bolt cavities in one end that are threadably mounted onto each end of the threaded bolt protruding beyond the exterior, unopposed faces of each block.

24. The model of claim 23 further comprising handle cavities disposed in the exterior unopposed faces of each block that contain a portion of each threaded handle below the exterior faces of the blocks.

25. A model for demonstrating the application of group theory to symmetry operations comprising:

a rigid cube having a plurality of faces intersecting to form corners of the cube, each face of said cube having a plurality of peg mounting openings disposed therein which are adjacent to, but displaced from, the corners of the cube, the number of said openings corresponding at least to the number of asymmetric units of the particular point group to be demonstrated, said openings being displaced from a rotational symmetry axis or a plane of symmetry of the model; and a plurality of pegs mounted to the faces of the cube in the peg mounting openings to represent the appropriate number of asymmetric units necessary for the particular point group to be demonstrated.

26. The model of claim 25 wherein the location of said peg mounting openings adjacent the corners of each of the faces of said blocks is the same.

27. The model of claim 26 wherein the pegs have a mounting portion, mountable within the peg mounting opening of the cube, and a knob disposed at one end of the mounting portion.

28. The model of claim 27 wherein the pegs are affixed within the peg mounting openings.

29. The model of claim 27 wherein the mounting portion of the pegs are cylindrical mounting portions and the peg mounting openings are cylindrical peg mounting openings.

* * * * *